3,264,222
REFRACTORY MATERIAL

Frederick D. Carpenter, San Diego, and Ling Yang, La Jolla, San Diego, Calif., assignors to General Dynamics Corporation, New York, N.Y., a corporation of Delaware
No Drawing. Filed Mar. 26, 1962, Ser. No. 182,617
9 Claims. (Cl. 252—301.1)

The present invention generally relates to refractory material and more particularly relates to high temperature refractory products having a low permeability to gases and having high structural strength, density and thermal conductivity and to a method of making the same.

Refractory materials have a wide range of applications, depending upon their physical and chemical characteristics. For certain purposes, as for example high temperature bearing materials, cutting compounds and the like, such refractory materials should exhibit high structural strength and wear resistance, high density, good thermal conductivity and hardness. Such characteristics are also desirable in high temperature refractory materials suitable for use in nuclear reactor components, thermionic emitters, etc. In additions, in many instances, it is desirable that the reactor components, thermionic emitter materials, etc., exhibit very low gas permeability, as for example, low permeability to volatilized fission products.

Heretofore, difficulties have been encountered in providing refractory materials with the indicated desirable physical properties. Now, however, a simple, effective method has been discovered, whereby refractory products can be readily fabricated, which products have the desired high structural strength, wear resistance, density, hardness, thermal conductivity, and low gas permeability. Such refractory products can be fabricated from readily available materials by a procedure which utilizes a relatively small number of processing steps employing conventional processing equipment.

Accordingly, it is the principal object of the present invention to provide improved refractory products. It is a further object of the present invention to provide high temperature refractory products which have a low permeability to gases such as volatilized fission products and which have increased structural strength, durability, density, hardness and thermal conductivity. It is a further object of the present invention to provide a simple effective method for producing such refractory products. Further objects and advantages of the present invention will be apparent from a study of the following detailed description.

The present invention includes mixing together carbon ceramic material and refractory metal-containing material. The latter provides, during processing, a refractory-forming metal, which metal combines with carbon or graphite of the ceramic material to form a gas permeability-reducing high temperature carbide bonding agent.

The refractory metal-containing material is added to the ceramic mixture as a powder of desired mesh size and may be in the form of high temperature refractory metal, such as zirconium, niobium, titanium, tantalum, vanadium, tungsten, molybdenum, rhenium or the like, preferably zirconium. It may also be a mixture of two or more of such metals. Alternatively, and preferably for the purposes of the present invention, heat decomposable compounds of such metals are employed for such purposes. However, such compounds should undergo decomposition in an inert or reducing atmosphere at a temperature below the temperature at which carbide normally forms from the metal itself. Moreover, the heat decomposable compound is selected so that it yields during decomposition a non-oxidizing gas such as hydrogen, nitrogen, etc. It should not yield oxygen during decomposition, i.e., during the hot pressing procedure, since oxygen would react with carbon or graphite in the system.

It has been found that a preferred species of such heat decomposable compounds is zirconium hydride. However, the present invention also contemplates the use of other hydrides, nitrides, etc., which decompose below carbide-forming temperature during hot pressing to yield the refractory metal. A dense, hard, thermally conductive, low gas permeability product having increased structural strength and wear resistance results from the processing.

More particularly, the present invention is especially directed to a method for the manufacture of carbon-containing (amorphous carbon or graphite) high temperature refractory products, in an oxygen-free environment, in which process a refractory metal carbide is formed in situ from a molten metal component and the carbon or graphite. Hot pressing is employed which utilizes at one or more stages thereof, a temperature above the melting point of the metal, which molten metal then forms the carbide with the carbon or graphite. High pressures are also employed to facilitate densification and impermeabilization of the product being formed.

Now considering more particularly the steps of the method of the present invention, graphite- or carbon-containing ceramic material in powdered form of suitable mesh size (microns), is uniformly mixed with a suitable concentration of a refractory metal-containing material.

The ceramic material may and preferably does consist essentially of carbon or graphite. Alternatively, it may comprise a mixture of carbon and/or graphite and one or more high temperature refractory materials such as beryllia, alumina, titania, zirconia, etc. The carbon and/or graphite should be in the ceramic material in a concentration sufficient to allow formation of enough carbide from the carbide-forming metal to adequately bond the mixture during hot pressing into the desired hard, dense, structurally stable product and to provide the desired reduction in gas permeability in the product. It will be understood that the carbon or graphite concentration in the ceramic mixture can therefore vary, depending on the characteristics desired in the finished product. It is desirable, however, that enough carbon and/or graphite be included in the ceramic mixture to allow formation of carbide from essentially all carbide-forming metal present in the mixture during processing.

Such metals and/or heat decomposable compounds thereof are mixed in any suitable concentration with the ceramic material, as for example, in a concentration of between about 10 and about 50% by moles of the finished product. Inasmuch as the carbide or carbides formed during the hot pressing are ordinarily not as good moderators as the ceramic material with which they are mixed, as for example, graphite and carbon, the concentration thereof formed during processing may be controlled, particularly where the product is to be used as neutron moderator in a nuclear reactor, so that the desired increased density and lower gas permeability, etc., are provided while still providing a product which is an effective moderator. However, as will be more clearly illustrated hereinafter, generally, the greater the concentration of high temperature refractory metal carbide formed and present in the product in accordance with the present process, the greater the improvement in hardness and structural strength and the greater the reduction in gas permeability.

It will be understood that hereinafter wherever the term carbon is used by itself, such term is meant to include both amorphous carbon and graphite.

Mixing of the ceramic material with the refractory metal-containing materials is carried out in any suitable manner to assure uniform distribution of the constituents throughout the mix. For example, after the powders are preliminarily mixed, a suitable wetting agent, for example, acetone, can be added thereto and a slurry produced, which slurry can be stirred during evaporation of the acetone so as to effect homogenous blending of the constituents.

After the mixing is completed, hot pressing thereof is carried out in an oxygen-free environment. Thus, the mixture is disposed, in suitable hot pressing equipment, such as an electrically heated graphite die, and is therein subjected to elevated pressures, for example, of from about 4,000 to 20,000 p.s.i., preferably from about 10,000 to about 15,000 p.s.i., with the simultaneous application of heat. As the temperature in the die increases, any heat decomposable compound of the refractory forming metal decomposes to the metal. The temperature is further increased until such metal melts and fills the pores thereof, forming carbide by reaction with carbon or graphite in the ceramic material so as to firmly bond the hot pressed powder together. For example, where zirconium hydride is used in the mixture, during hot pressing it undergoes decomposition at less than about 1,000° C., leaving zirconium metal in the mixture. Zirconium metal melts as the temperature is increased to about 1865° C., fills the pores of the ceramic mixture and forms zirconium carbide, firmly bonding the pressed mixture together. It is preferable to employ, depending upon the refractory carbide-forming metal or heat decomposable compound thereof in the mixture, temperatures during the hot pressing operation of from about 2,000° C., to about 2,500° C., i.e., substantially above the melting point and carbide-forming point of the metal to assure completion of the metal-melting and carbide-forming steps in a relatively short period of time.

It will be noted that melting of the metal before substantial carbide formation is an essential feature of the present invention. Accordingly, during the hot pressing the temperature is increased sufficiently rapidly to above the melting point of the metal to avoid substantial carbide formation without prior melting of the metal. After such melting, carbide formation is then allowed to proceed to completion. The hot pressing operation is continued for a sufficient period of time to effect the indicated results and thereafter, the product is slowly cooled at a rate which prevents cracking of the product. The cooled, low gas permeability, high structural strength, dense, hard, refractory product is then removed from the die and is ready for further processing or for use as such.

Materials in addition to those described can be included in the mix before the hot pressing operation. For example, if it is desired to fabricate a nuclear fuel compact containing neutron moderator and having low permeability to volatilized fission products, refractory nuclear fuel material, such as uranium or thorium carbide, etc., can be added to the mix. The hot pressing can then be carried out in the described manner to produce an improved nuclear fuel compact. Similarly, other constituents can be added to the mix, depending upon the intended use of the product.

It will be obvious that the conditions for carrying out the hot pressing operation can be varied, somewhat, depending upon the constituents in the mix. However, in each instance, the highest temperature reached during hot pressing should be above the melting point of the refractory metal which is initially present in the mix or which is released to the mix by the heat decomposition of the indicated selected compounds. The hot pressing should be continued at the elevated temperature for a sufficiently long period of time to assure carbide formation from the molten metal at all points throughout the mixture, so that the product is uniformly strong, dense, hard and of low gas permeability.

The following examples further illustrate certain features of the present invention.

EXAMPLE I

Zirconium hydride powder was mixed with graphite powder of a type known as GP–38, in various ratios as specified in table I below. The powders were weighed into a small aluminum test tube before mixing and in each instance were then preliminarily mixed together, then slurried with acetone. The slurry was then stirred to homogeneously blend the zirconium hydride and graphite together and to evaporate the acetone. In each instance, when the acetone had completely evaporated, the dried powder mix was then loaded into a graphite die and subjected therein to hot pressing utilizing a temperature which reached a maximum of between about 2000° C. and 2400° C., and a pressure of about 14,000 p.s.i. over a period of about four hours. The mixture in the die was then allowed to cool to room temperature and was then removed from the die and the density thereof and the permeability thereof were measured. The results are set forth in table I below:

Table I

| Sample No. | Final Product Composition | Theoretical Density | Measured Density | Gas Permeability (cm.²/sec.) |
| --- | --- | --- | --- | --- |
| 1 | Pure Graphite | 2.23 | 1.94 | 4.5×10⁻³ |
| 2 | 10 ZrC/90 C | 3.32 | 2.80 | |
| 3 | 20 ZrC/80 C | 4.10 | 3.76 | |
| 4 | 30 ZrC/70 C | 4.71 | 4.63 | 1.06×10⁻⁵ |
| 5 | 50 ZrC/50 C | 5.56 | | |

The results as specified in table I above clearly indicate that the addition of zirconium-hydride in the ceramic mix and the formation of zirconium carbide therefrom in situ during hot pressing in accordance with the present method, resulted in an increase in the density of the product in contrast to the graphite (Sample No. 1) product containing no bonding agent, but subjected to the same hot pressing technique. Table I further indicates that, as the proportion of zirconium carbide formed in the mixture to the carbon or graphite present increased, the density of the product also increased. Moreover, the permeability of the product decreased. Accordingly, it is desirable to have substantial proportions of the finished product comprise zirconium carbide (or other suitable refractory metal carbide bonding agent) formed in situ during the hot pressing operation. It will be understood that during hot pressing, the mix was not held at a temperature only sufficient to bring about slow carbide formation without prior melting of the main proportion of the refractory metal in the mix. Instead, the temperature employed was sufficiently high to assure rapid melting of the metal before substantial carburization thereof. This was to insure that the metal would perform the task of wetting the ceramic material and fill the pores, crevices, etc., thereof before carbide was formed therefrom. Such wetting and porefilling were essential to substantial reduction in the permeability of the graphite.

Example II further illustrates certain features of the present invention.

EXAMPLE II

An intimate mixture of approximately 20 percent, by weight, of titanium powder, 20 percent, by weight, of graphite powder and 60 percent, by weight, of uranium monocarbide (UC) powder is prepared. The mixture is then placed in an electrically heated graphite die in a hydrogen atmosphere and subjected to a pressure of 10,000 p.s.i. while the temperature is increased to about 2200° C. sufficiently rapidly to melt the titanium without substantial prior titanium carbide formation. The mixture is then held at 2200° C. for about 3 hours, after which it is allowed to gradually cool to room temperature. The finished unitary fuel compact thus prepared is removed from the die and examined. It is found that such compact is dense, hard, structurally strong, electrically conductive and has a gas permeability comparable to that of Sample No. 4 of Example I.

Examples I and II clearly illustrate that the method of the present invention produces a high temperature refractory product of improved characteristics in a rapid, simple and effective manner, utilizing conventional equipment and readily available constituents. Such products are suitable for use in a wide variety of high temperature applications.

Various of the features of the present invention are set forth in the appended claims.

What is claimed is:

1. A method of fabricating a high temperature refractory product which method comprises mixing together particles of carbon and particles of a member selected from the group consisting of refractory metals, compounds of said metals which are heat decomposable below the melting point of said metals and below the carbide-forming temperature of said metals and which yield said metals and oxygen-free gas on decomposition, and mixtures of said metals and said compounds, sufficient carbon being provided to form a matrix and to carburize said refractory metal, compressing the resultant mixture to form a porous carbon matrix and sufficiently rapidly heating to a temperature above the melting temperature of the refractory metal to melt said refractory metal and cause the molten refractory metal to flow into the pores of the carbon matrix before substantial carburization of said refractory metal occurs, and retaining said mixture at sufficient temperature and pressure so that substantially all of said molten refractory metal reacts with said carbon to form refractory metal carbide, sufficient refractory metal carbide being formed to provide substantial reduction of gas permeability of said carbon matrix and to substantially increase the strength thereof.

2. A method of fabricating a high temperature refractory product which method comprises mixing together particles of carbon and particles of a member selected from the group consisting of refractory metals, compounds of said metals which are heat decomposable below the melting point of said metals and below the carbide-forming temperature of said metals and which yield said metals and oxygen-free gas on decomposition, and mixtures of said metals and said compounds, sufficient carbon being provided to form a matrix and to carburize said refractory metal, compressing the resultant mixture to form a porous carbon matrix and sufficiently rapidly heating to a temperature above the melting temperature of the refractory metal to melt said refractory metal and cause the molten refractory metal to flow into the pores of the carbon matrix before substantial carburization of said refractory metal occurs, and retaining said mixture at sufficient temperature and pressure so that substantially all of said molten refractory metal reacts with said carbon to form refractory metal carbide, sufficient refractory metal being provided so that said refractory metal carbide forms at least about 10% by moles of the final product.

3. A method of fabricating a high temperature refractory product which method comprises mixing together particles of graphite and particles of a member selected from the group consisting of zirconium, zirconium hydride, and mixtures of zirconium and zirconium hydride, sufficient graphite being provided to form a graphite matrix and to carburize said zirconium, compressing the resultant mixture to form a porous graphite matrix and sufficiently rapidly heating to a temperature above the melting temperature of zirconium to melt said zirconium and cause molten zirconium to flow into the pores of the graphite matrix before substantial carburization of said zirconium occurs, and retaining said mixture at sufficient temperature and pressure so that substantially all of said molten zirconium reacts with said graphite to form zirconium carbide, sufficient zirconium being provided so that said zirconium carbide forms at least about 10% by moles of the final product.

4. A method of fabricating a high temperature refractory product which method comprises mixing together carbon particles and particles of a refractory metal compound which is heat decomposable below the melting point of said metal and below the carbide-forming temperature of said metal and which yields said metal and oxygen-free gas on decomposition, sufficient carbon being provided to form a matrix and to carburize said refractory metal, compressing the resultant mixture to form a porous carbon matrix and sufficiently rapidly heating to a temperature above the melting temperature of the refractory metal to melt said refractory metal and cause the molten refractory metal to flow into the pores of the carbon matrix before substantial carburization of said refractory metal occurs, and retaining said mixture at sufficient temperature and pressure so that substantially all of said molten refractory metal reacts with said carbon to form refractory metal carbide, sufficient of said refractory metal compound being provided to form refractory metal carbide in an amount at least about 10% by moles of said final product.

5. The method of claim 4 wherein the heat-decomposable compound is a refractory metal hydride.

6. The method of claim 5 wherein said carbon particles are particles of graphite and wherein said refractory metal hydride is zirconium hydride.

7. The method of claim 4 wherein particles of a nuclear fuel carbide are included in said mixture.

8. The method of claim 7 wherein said carbon particles are particles of graphite, wherein said heat-decomposable compound is zirconium hydride and wherein said nuclear fuel carbide is uranium carbide.

9. A method of fabricating a high temperature refractory product which method comprises mixing together particles of graphite and particles of zirconium hydride, sufficient graphite being provided to form a matrix and to carburize said zirconium, compressing the resultant mixture under at least about 4,000 p.s.i. to form a porous graphite matrix and sufficiently rapidly heating to about 2000° C. to melt said zirconium and cause molten zirconium to flow into the pores of the graphite matrix before substantial carburization of said zirconium occurs, and retaining said mixture at sufficient temperature and pressure so that substantially all of said molten zirconium reacts with said graphite to form zirconium carbide, sufficient zirconium being provided so that said zirconium carbide forms at least about 10% by moles of the final product.

References Cited by the Examiner

UNITED STATES PATENTS

| 1,848,437 | 3/1932 | Sieger et al. | 75—203 |
| 2,193,413 | 3/1940 | Wright | 75—203 |
| 2,228,916 | 1/1941 | Simons | 75—203 |
| 2,244,053 | 6/1941 | Comstock | 75—203 |
| 2,798,809 | 7/1957 | Goetzel et al. | 75—204 |
| 2,895,822 | 7/1959 | Peras | 75—204 |
| 2,998,641 | 9/1961 | Atkinson et al. | 75—203 |
| 3,087,877 | 4/1963 | Goeddel et al. | 75—203 |

OTHER REFERENCES

Nuclear Fuel Elements by Hausner et al., November 1959, pp. 197–202, 208.

Schwarzkopf et al.: Cemented Carbides, page 30, the Macmillan Company, New York 1960.

LEON D. ROSDOL, *Primary Examiner.*

OSCAR R. VERTIZ, CARL D. QUARFORTH, REUBEN EPSTEIN, *Examiners.*

R. W. MacDONALD, A. G. BOWEN, L. A. SEBASTIAN,
*Assistant Examiners.*